(12) United States Patent
Metz et al.

(10) Patent No.: US 6,290,768 B1
(45) Date of Patent: Sep. 18, 2001

(54) FLOW-ENHANCED PIGMENT PREPARATION FOR OFFSET PRINTING

(75) Inventors: Hans Joachim Metz, Darmstadt; Joachim Weide, Kelkheim; Thomas Wallach, Huenfelden, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/376,030

(22) Filed: Aug. 17, 1999

(30) Foreign Application Priority Data

Aug. 18, 1998 (DE) .............................................. 198 37 302

(51) Int. Cl.$^7$ ............................ C09B 67/08; C09B 67/20; C09D 11/02
(52) U.S. Cl. ...................... 106/493; 106/31.72; 106/499; 106/500; 106/505
(58) Field of Search ..................................... 106/493, 499, 106/500, 505, 31.72

(56) References Cited

U.S. PATENT DOCUMENTS

| | | |
|---|---|---|
| 3,935,145 | 1/1976 | Rudolphy ............................ 525/54.4 |
| 4,139,500 | * 2/1979 | Ruldolphy ......................... 525/54.44 |
| 5,405,932 | 4/1995 | Bender et al. ........................ 528/104 |
| 5,427,612 | * 6/1995 | Bender ................................. 524/270 |
| 5,451,634 | * 9/1995 | Bender ................................. 525/54.4 |
| 5,498,684 | * 3/1996 | Bender ................................... 528/40 |
| 5,556,454 | * 9/1996 | Bender ................................... 106/218 |
| 5,594,099 | * 1/1997 | Bender ................................... 530/218 |
| 5,597,884 | * 1/1997 | Bender ................................... 528/34 |
| 5,645,636 | 7/1997 | Schneider et al. ................... 106/493 |
| 5,708,078 | 1/1998 | Bender et al. ..................... 525/54.42 |

FOREIGN PATENT DOCUMENTS

| | | |
|---|---|---|
| 2 150 216 | 4/1973 | (DE) . |
| 41 14 863 | 11/1991 | (DE) . |
| 19509648 | * 9/1996 | (DE) . |
| 19857991 | * 7/1999 | (DE) . |
| 0 548 506 | 6/1993 | (EP) . |
| 641811 | * 9/1994 | (EP) . |
| 0 725 096 | 8/1996 | (EP) . |
| 0 733 685 | 9/1996 | (EP) . |
| 0 768 349 | 4/1997 | (EP) . |
| 0 769 538 | 4/1997 | (EP) . |
| 0 773 233 | 5/1997 | (EP) . |
| 0 816 389 | 1/1998 | (EP) . |
| 0 816 392 | 1/1998 | (EP) . |

OTHER PUBLICATIONS

EPO Search Report (Jan. 2000).
Derwent Patent Family Abstract for EP 0 769 538 (Apr. 1997).
Derwent Patent Family Abstract for EP 0 816 392 (Jan. 1998).
Derwent Patent Family Abstract for 0 816 389 (Jan. 1998).
Derwent Patent Family Abstract for EP 0 733 233 (May 1997).
Derwent Patent Family Abstract for EP 0 725 096 (Aug. 1996).

* cited by examiner

*Primary Examiner*—Anthony Green
(74) *Attorney, Agent, or Firm*—Susan S. Jackson; Scott E. Hanf

(57) ABSTRACT

Pigment preparations comprising an organic pigment and a phenol-modified natural resin derivative having a weight-average molecular weight ($M_w$) of from 400 to 10,000 g/mol which is obtainable by reacting a mixture of reactants containing a) from 50 to 95% by weight of natural resin or natural resin acids, b) from 0.5 to 30% by weight of monocyclic or polycyclic phenols, c) from 0.01 to 15% by weight of aldehydes or aldehyde acetals, d) from 0.001 to 2% by weight of metal compounds from groups Ia and IIa of the Periodic Table, and e) from 4.489 to 30% by weight of α,β-ethylenically unsaturated carboxylic acids or their anhydrides and has an acid number in the range from 160 to 300 mg of KOH per g of resin, preferably from 200 to 260 mg of KOH per g of resin, are used advantageously in offset printing.

13 Claims, No Drawings

FLOW-ENHANCED PIGMENT PREPARATION FOR OFFSET PRINTING

CROSS-REFERENCE TO RELATED APPLICATION

The present invention is described in the German priority application No. 198 37 302.3, filed Aug. 18, 1998, which is hereby incorporated by reference as is fully disclosed herein.

BACKGROUND OF THE INVENTION

The invention relates to pigment preparations which are covered with a new kind of resin base and which when used as printing inks for offset printing exhibit improved rheological properties.

It is known that resinated pigments possess enhanced color strength, gloss, transparency and good dispersibility in the application medium for offset printing inks.

Simple natural resins based on rosin have been found to be particularly suitable for pigment preparation. Rosin consists of a mixture of various resin acids, predominantly abietic acid, pimaric acid and derivatives thereof. Resins based on rosin are often modified chemically owing to their sensitivity to oxidation, such modification being brought about, for example, by disproportionation or hydrogenation. These chemical derivatives of the natural resin acids possess an average molar mass of about 300 g mol$^{-1}$. These resin types are therefore referred to as low molecular mass resins. However, when used in modern offset printing inks, the pigments prepared with these rosin derivatives have a tendency to mist. Misting means that, in the roll nips of modem, high-speed offset rotary presses, especially between the inking rollers and the printing plate cylinder, the printing ink tends to form an aerosol. The aerosol comes about through the breakup of threads of printing ink which are formed in the course of the spreading of the printing ink on the exit side of the roll nips. The fine ink mist soils the printing presses and pollutes the ambient air.

SUMMARY OF THE INVENTION

It is therefore an object to prepare printing-ink pigments such that they lose their tendency to mist but do justice to the high performance requirements in offset printing inks, such as suitable rheology and high color strength. It has been found that pigments prepared with defined resol-modified resin acid derivatives having an average molar mass of from 400 to 10,000 g/mol surprisingly achieve this object.

DESCRIPTION OF THE PREFERRED EMBODIMENTS

The invention therefore provides pigment preparations comprising an organic pigment and a phenol-modified natural resin derivative having a weight-average molecular weight ($M_w$) of from 400 to 10,000 g/mol which is obtainable by reacting a mixture of reactants containing a) from 50 to 95% by weight of natural resin or natural resin acids, b) from 0.5 to 30% by weight of monocyclic or polycyclic phenols, c) from 0.01 to 15% by weight of aldehydes or aldehyde acetals, d) from 0.001 to 2% by weight of metal compounds from groups Ia and IIa of the Periodic Table, and e) from 4.489 to 30% by weight of α,β-ethylenically unsaturated carboxylic acids or their anhydrides and has an acid number in the range from 160 to 300 mg of KOH per g of resin, preferably from 200 to 260 mg of KOH per g of resin.

The proportions specified for components a) to e) are always based on the sum of all components, which is always 100% by weight. By varying the proportions of components it is possible to tailor the solubility in dilute sodium hydroxide solution, the molecular weight and the pigment wettability to the desired levels. Preference is given to those phenol-modified natural resin derivatives which are soluble to form clear solutions in at least 10% strength by weight sodium hydroxide solution.

Examples of suitable natural resins or natural resin acids a) are rosin (tree resin), tall resin, roof resin or partially hydrogenated, disproportionated and dimerized natural resins.

The phenol component b) consists of monocyclic or polycyclic phenols. Use may be made, for example, of phenol, various cresols, butylphenol, amylphenol, nonylphenol, octylphenol, phenylphenol and bisphenol A, which have a functionality of two or more with respect to oxo compounds; mixtures of nonylphenol and bisphenol A are particularly preferred. The preferred proportion of components b) in the natural resin derivatives is from 1 to 25% by weight, in particular from 1.5 to 10% by weight.

As aldehyde component or aldehyde acetal component c) it is preferred to employ the aldehydes and aldehyde acetals normally used for preparing resols and novolaks. In particular, formaldehyde in aqueous solution or in oligomeric or polymeric form is used; paraformaldehyde is particularly preferred. Component c) is present in natural resin derivatives preferably in a proportion of from 0.02 to 10% by weight, in particular from 0.05 to 7% by weight.

Examples of suitable metal compounds d) from groups Ia and IIa of the Periodic Table are metal oxides and metal hydroxides or carboxylate salts of these metals. Particular preference is given to sodium salts or their aqueous solutions, especially sodium hydroxide. The metal compound d) is present in a proportion of preferably 0.002 to 1.8% by weight, in particular from 0.005 to 1% by weight.

As α,β-ethylenically unsaturated carboxylic acids or their anhydrides e) it is possible preferably to employ aliphatic or aromatic/aliphatic carboxylic acids having 3 to 22 carbon atoms, especially methacrylic acid, fumaric acid, maleic acid, maleic anhydride, itaconic acid or cinnamic acid; acrylic acid is particularly preferred. Component e) is present preferably in a proportion of form 5 to 20% by weight.

The preparation of the phenol-modified natural resin derivatives is carried out by reacting components a) to e) in solution or, preferably, in bulk at temperatures in the range from 100° C. to 300° C., preferably from 110° C. to 280° C. and, in particular, from 140° C. to 260° C. For this purpose either the entire mixture of all components employed is reacted or individual components are introduced and the remainder are reacted by metered addition. The reaction is conducted such that natural resins or natural resin acids from group a) are reacted with α,β-ethylenically unsaturated carboxylic acids or their anhydrides from group e) in the temperature range from preferably 140 to 240° C., are mixed with phenolic components from group b), aldehyde components from group c) and a metal compound from group d) and are reacted at a temperature of from 100 to 260° C., preferably from 110 to 160° C., preferably under a pressure of between 1 and 10 bar, in particular from 1 to 5 bar.

Instead of phenol and aldehyde, or else proportionately with them, it is possible to use a phenol-formaldehyde condensation product prepared separately by known methods from phenols and aldehydes in the presence of basic catalysts at a temperature of from 50 to 160° C., preferably from 60 to 100° C., and at atmospheric or elevated pressure. If a separately prepared phenol-formaldehyde condensation product is used, then it is possible to operate under atmospheric pressure. In a deviation from the above process, the condensation product of the phenol components b) and aldehyde components c) can also be prepared advantageously in situ in the resin melt. In the case of this reaction regime, which is energetically more favorable and in which a higher aldehyde conversion is achieved, first of all the natural resin acids from group a), phenolic components from group b), aldehyde components from group c) and metal compounds from group d) are reacted with one another at a temperature of from 100 to 260° C., preferably from 110 to 160° C., under a pressure of from 1 to 10 bar, preferably from 1.5 bar to 5 bar. The resultant mixture is then reacted with α,β-ethylenically unsaturated carboxylic acids or their anhydrides from group e) in the temperature range from 100 to 260° C., preferably from 160° C. to 240° C.

In the synthesis process of the invention the progress of the reaction is judiciously monitored on the basis of the acid number and melting point of the reaction mixture. On reaching an acid number of 160–300 mg of KOH per g of resin, preferably 200–260 mg of KOH per g of resin, the reaction is terminated by cooling the melt to room temperature. Volatile components can be removed from the reaction mixture in this case by applying reduced pressure before or else during the cooling operation.

The molecular weight of the resins of the invention can be determined by gel permeation chromatography of the resin solutions in tetrahydrofuran (THF) on polystyrene gel in a permeation measuring instrument in accordance with known methods. The average molecular weight (weight average $M_w$) of the resins of the invention lies within the range from 400 to 10,000 g/mol, preferably from 1000 to 8000 g/mol, and in particular, from 1200 to 5000 g/mol.

Preferably, the resins employed in accordance with the invention are soluble to form clear solutions in 2.5% strength by weight sodium hydroxide solution at a concentration in the range from 1 to 45% by weight, preferably from 2 to 30% by weight and, with particular preference, from 5 to 20% by weight. To determine the solubility in 2.5% strength by weight sodium hydroxide solution, the resins of the invention are pulverized and dissolved with stirring at 70° C. in the dilute sodium hydroxide solution, and the solution is cooled to 23° C.

Suitable pigments of the pigment preparation of the invention are all organic pigments suitable for offset printing inks, especially diaryl yellow pigments.

Examples of suitable printing-ink pigments are C.I. Pigment Yellow 12, 13, 14, 17, 55, 74, 83, 126, 127, 174, 176, 188, C.I. Pigment Orange 16, 34, C.I. Pigment Red 57:1 and 63:1, and mixtures of these pigments.

For the purposes of the present invention, preference is given to pigment preparations containing from 50 to 90, preferably from 60 to 90 and, in particular, from 65 to 75% by weight of organic pigment, from 10 to 50, preferably from 10 to 40 and, in particular, from 25 to 35% by weight of phenol-modified natural resin derivative, and from 0 to 5% by weight of customary additives and auxiliaries. Examples of customary additives and auxiliaries are cationic, anionic and nonionic surfactants.

The invention also provides a process for preparing a pigment preparation, which comprises adding the phenol-modified natural resin derivative during the preparation of the organic pigment or to the finely divided powder, to a presscake or to an aqueous or organic suspension of the finished organic pigment.

The direct preparation of the pigment suspensions obtained in the course of pigment manufacture—in the case of azo pigments, for example, after coupling or laking—with the phenol-modified natural resin derivative is particularly advantageous. Preparation with the phenol-modified resin of the invention can also be carried out subsequently on finely divided powder pigments and pigment presscakes resuspended in water.

The pigment preparations of the invention lend themselves readily to dispersion in varnishes common for offset printing inks, and produce printing inks having high color strengths, high gloss, good transparency and improved penetration. Misting, if it occurs at all, is minimal. Despite a higher viscosity than is usual, the offset printing inks prepared from the pigment preparations of the invention possess good rheological properties, such as flowability, for example. Even with high resin contents in the pigment preparations, such as 30–40% by weight resin, the color strengths which result when these preparations are processed to printing inks are comparable with or higher than those of customary resinated pigments.

The present invention also provides offset printing inks consisting essentially of the pigment preparation of the invention and a conventional offset printing ink varnish, such as, for example, for sheet-fed offset, roller offset and newspaper printing.

EXAMPLES

Preparation Examples for Phenol-modified Natural Resin Derivatives

Preparation Example 1

In a heatable 2-liter multi-necked flask with stirrer, thermometer, dropping funnel and reflux condenser, 600 g of commercial rosin were melted under a nitrogen atmosphere, and acrylic acid was metered into the melt, which was at 190° C. The acrylic acid was metered at a rate such that reflux came about at the reflux condenser. Two hours after the end of the metered addition of acrylic acid, the reaction mixture is cooled to 140° C. and 10% by weight of an 85% strength by weight xylene solution of a conventionally prepared resol was added (resol composition: 71% by weight nonylphenol, 4.8% by weight bisphenol A, 23.9% by weight formaldehyde, 0.3% by weight sodium hydroxide). The reaction mixture is heated to 200° C. over 1 hour and then a reduced pressure of 100 mbar is applied for 0.25 hours in order to remove the volatile constituents. After the end of vacuum distillation, the reaction mixture is cooled to room temperature. The resin has a melting point of 100 °C,, an acid number of 230 mg of KOH per g of resin, a weight-average molecular weight of 5000 g/mol and a solubility in 2.5% strength sodium hydroxide solution of 25% by weight.

Preparation Example 2

In a heatable 2-liter autoclave with stirrer, 600 g of rosin are melted under a nitrogen atmosphere. 36 g of nonylphenol, 21 g of bisphenol A, 0.25 g of sodium hydroxide and, at 110° C., 12 g of paraformaldehyde are added. The autoclave is then sealed so as to be pressuretight and is brought to a temperature of 140° C. At this temperature, 10 g of maleic anhydride are added and the mixture is held at this temperature for 0.25 hours. The reaction mixture is subsequently heated to 195° C. and 48 g of acrylic acid are metered in over a period of 1 hour using a pump. After the end of the metered addition, the melt is stirred at 200° C. for 1.5 h, then finally is discharged from the autoclave and cooled to room temperature. The resin has a melting point of 105° C., an acid number of 240 mg of KOH per g of resin, a weight-average molecular weight of 2000 g/mol and a solubility in 2.5% strength sodium hydroxide solution of 15% by weight.

Examples of Pigment Preparations

Example 1

138 parts of C.I. Pigment Yellow 176 are suspended in about 2000 parts of water and pH of 11 is established using sodium hydroxide solution. 80 parts of the resin from Preparation Example 2 dissolved in 700 parts of water and 41 parts by volume of 33% strength by weight sodium hydroxide solution are added to this suspension. The pigment preparation is subsequently heated to 98° C. and stirred at this temperature for one hour. After cooling to 65° C., the resin is precipitated by the addition of about 80 parts by volume of 31% strength hydrochloric acid to a pH of 4. The pigment preparation is filtered, washed to neutrality and dried at 60° C. in a drying cabinet. Grinding gives 216 parts of a yellow powder.

Example 2

131 parts of C.I. Pigment Yellow 12 are suspended in about 1000 parts of water and pH of 7 to 7.5 is established using sodium hydroxide solution. 67 parts of the resin from Preparation Example 2 dissolved in 700 ml of water and 35 parts by volume of 33% strength by weight sodium hydroxide solution are added to this suspension. The pigment preparation is subsequently heated to 90° C. and stirred at this temperature for half an hour. After cooling to 65° C., the resin is precipitated by the addition of about 68 parts by volume of 31% strength by weight hydrochloric acid to a pH of 4. The pigment preparation is filtered, washed to neutrality and dried at 60°0 C. in a drying cabinet. Grinding gives 196 parts of a yellow powder.

Example 3

137 parts of C.I. Pigment Yellow 127 are suspended in about 1000 parts of water and pH of 11 is established using sodium hydroxide solution. 34 parts of the resin from Preparation Example 1 dissolved in 400 ml of water and 18 parts by volume of 33% strength by weight sodium hydroxide solution are added to this suspension. The pigment preparation is subsequently heated to 90° C. and stirred at this temperature for half an hour. After cooling to 65° C., the resin is precipitated by the addition of about 35 parts by volume of 31% strength by weight hydrochloric acid to a pH of 4. The pigment preparation is filtered, washed to neutrality and dried at 60° C. in a drying cabinet. Grinding gives 169 parts of a yellow powder.

Example 4

134 parts of C.I. Pigment Yellow 174 are suspended in about 1000 parts of water and pH of 7 to 7.5 is established using sodium hydroxide solution. 66 parts of the resin from Preparation Example 2 dissolved in 700 ml of water and 34 parts by volume of 33% strength by weight sodium hydroxide solution are added to this suspension. The pigment preparation is subsequently heated to 98° C. and stirred at this temperature for half an hour. After cooling to 65° C., the resin is precipitated by the addition of about 68 parts by volume of 31% strength by weight hydrochloric acid to a pH of 4. The pigment preparation is filtered, washed to neutrality and dried at 60° C. in a drying cabinet. Grinding gives 198 parts of a yellow powder.

Example 5

88 parts of C.I. Pigment Red 57:1 and 0.9 part of C.I. Pigment Red 63:1, after conventional coupling and laking, are suspended in about 1500 parts of water and pH of 12.5 is established using sodium hydroxide solution. 20 parts of the resin from Preparation Example 1 dissolved in 130 parts of water and 8 parts by volume of 33% strength by weight sodium hydroxide solution are added to this suspension. The pigment preparation is subsequently stirred at 25° C. for two hours. Thereafter, the resin is precipitated by the addition of about 30 parts by volume of 60% strength by weight acetic acid to a pH of 5. The pigment preparation is filtered, washed to neutrality and dried at 80° C. in a drying cabinet. Grinding gives 108 parts of a red powder.

An offset printing ink with a pigment preparation prepared in accordance with one of Examples 1 to 5 exhibits an improved misting behavior in high-speed offset rotary presses in comparison to printing inks based on pigment preparations whose surfaces are covered with conventional natural resins. Relative to offset printing inks based on rosin-prepared pigments, the offset printing inks obtained in accordance with the invention exhibit good flow behavior in conventional varnishes despite higher viscosity.

What is claimed is:

1. A pigment preparation comprising from 50 to 90% by weight of an organic pigment and from 10 to 50% by weight of a phenol-modified natural resin derivative having a weight-average molecular weight ($M_w$) of from 400 to 10,000 g/mol obtained by reacting a mixture of reactants containing
    a) from 50 to 95% by weight of natural resin or natural resin acids,
    b) from 0.5 to 30% by weight of monocyclic or polycyclic phenols,
    c) from 0.01 to 15% by weight of aldehydes or aldehyde acetals,
    d) from 0.001 to 2% by weight of metal compounds from groups Ia and IIa of the Periodic Table, and
    e) from 4.489 to 30% by weight of α,β-ethylenically unsaturated carboxylic acids or their anhydrides, wherein a) to e) totals 100% by weight;

and the phenol-modified natural resin derivative has an acid number in the range from 160 to 300 mg of KOH per g of phenol-modified natural resin derivative.

2. The pigment preparation as claimed in claim 1, wherein the phenol-modified natural resin derivative has an acid number of between 200 and 260 mg of KOH per g of resin.

3. The pigment preparation as claimed in claim 1, wherein the weight-average molecular weight $M_w$ of the phenol-modified natural resin derivative is from 1000 to 8000 g/mol.

4. The pigment preparation as claimed in claim 1, wherein the phenol-modified natural resin derivative is soluble to form a clear solution in 2.5% strength by weight sodium hydroxide solution at a concentration in the range from 1 to 45% by weight.

5. The pigment preparation as claimed in claim 1, wherein the phenol-modified natural resin derivative is soluble to form a clear solution in 2.5% strength by weight sodium hydroxide solution at a concentration in the range from 2 to 30% by weight.

6. The pigment preparation as claimed in claim 1, wherein component a) comprises rosin, tall resin, root resin or partially hydrogenated, disproportionated or dimerized natural resins.

7. The pigment preparation as claimed in claim 1, wherein component b) is phenol, cresol, butylphenol, amylphenol, nonylphenol, octylphenol, phenylphenol or bisphenol A.

8. The pigment preparation as claimed in claim 1, wherein component e) is methacrylic acid, acrylic acid, fumaric acid, maleic acid, maleic anhydride, itaconic acid, cinnamic acid or a mixture thereof.

9. The pigment preparation as claimed in claim 1, wherein the organic pigment is C.I. Pigment Yellow 12, 13, 14, 17, 55, 74, 83, 126, 127, 174, 176, 188, C.I. Pigment Orange 16, 34, C.I. Pigment Red 57:1 and 63:1 or a mixture of these pigments.

10. The pigment preparation as claimed in claim 1, further comprising from 0 to 5% by weight of auxiliaries.

11. The pigment preparation as claimed in claim 1, containing from 65 to 75% by weight of organic pigment, from 25 to 35% by weight of phenol-modified natural resin derivative, and from 0 to 5% by weight of auxiliaries.

12. An offset printing ink consisting essentially of a pigment preparation as claimed in claim 1 and an offset printing ink varnish.

13. A method of preparing an offset printing ink comprising adding a pigment preparation to an offset printing ink varnish wherein the pigment preparation comprises from 50 to 90% by weight of an organic pigment and from 10 to 50% by weight of a phenol-modified natural resin derivative having a weight-average molecular weight ($M_w$) of from 400 to 10,000 g/mol obtained by reacting a mixture of reactants containing a) from 50 to 95% by weight of natural resin or natural resin acids, b) from 0.5 to 30% by weight of monocyclic or polycyclic phenols, c) from 0.01 to 15% by weight of aldehydes or aldehyde acetals, d) from 0.001 to 2% by weight of metal compounds from groups Ia and IIa of the Periodic Table, and e) from 4.489 to 30% by weight of $\alpha,\beta$-ethylenically unsaturated carboxylic acids or their anhydrides, wherein a) to e) totals 100% by weight;

and the phenol-modified natural resin derivative has an acid number in the range from 160 to 300 mg of KOH per g of phenol-modified natural resin derivative.

* * * * *